Nov. 19, 1940.  T. M. COFFELT  2,222,477
MEAT-TENDERING MACHINE
Filed Nov. 6, 1939
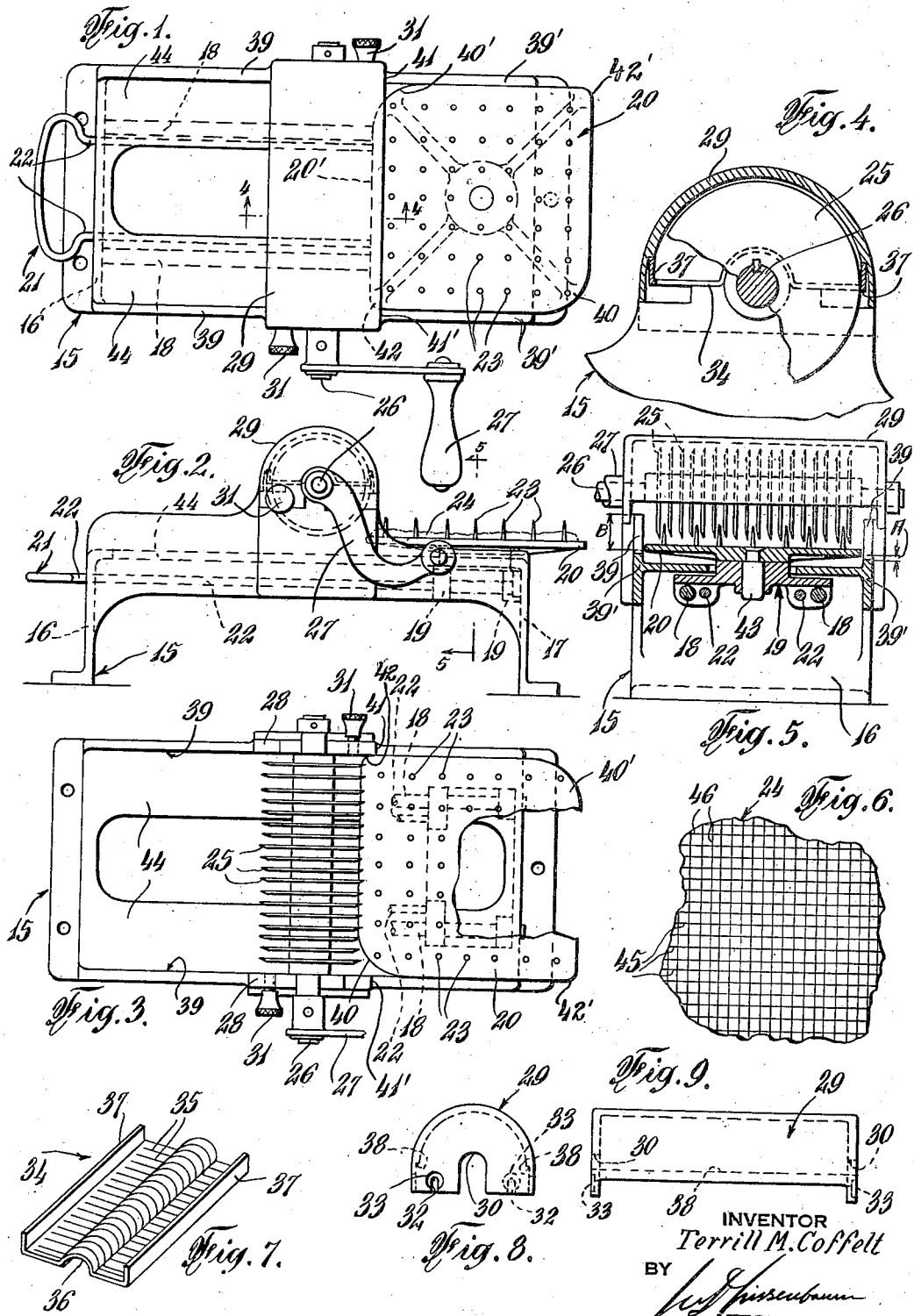
INVENTOR
Terrill M. Coffelt
BY
ATTORNEY Patented Nov. 19, 1940

2,222,477

UNITED STATES PATENT OFFICE 2,222,477

MEAT-TENDERING MACHINE

Terrill M. Coffelt, Cincinnati, Ohio, assignor to Harry Weiner, Spring Valley, N. Y.

Application November 6, 1939, Serial No. 303,034

1 Claim. (Cl. 17—27)

My present invention relates to manually operated meat tendering machines and more particularly to the type employing a rotatable series of parallel circular knives against which the meat is slid.

The principal object of this invention is to provide a machine of the character mentioned, of novel and improved construction, for crisscross slitting a meat slice the major portion of its thickness.

A further object is to provide a novel and improved machine of the type described, including a meat-carrying turn table capable at but one position thereof to be limitedly rotatably shifted, and at all others of its positions with regard to the knives being maintained against rotation.

A further object hereof is to provide a novel and improved meat tendering machine which is of simple and cheap construction, easy to clean, positive in action, and efficient in carrying out the purposes for which it is designed.

Other objects will become manifest as this disclosure proceeds.

In the accompanying drawing forming part of this application, similar characters of reference indicate corresponding parts in all the views.

Fig. 1 is a plan of a machine embodying the teachings of this invention, showing the turn table in one of its positions, prepared to be slid so that the meat be subjected to a slitting operation.

Fig. 2 is an elevation of the device shown in Fig. 1.

Fig. 3 is a view similar to Fig. 1, partly fragmentary, wherein the hood covering the knives and the stripper member are removed, and the turn table has been rotatably shifted a quarter turn, ready to be slid past the knives so that the meat shall be slitted in a transverse direction with respect to the initial operation effected by the arrangement of Fig. 1.

Fig. 4 is an enlarged fragmentary section taken at line 4—4 in Fig. 1.

Fig. 5 is an enlarged fragmentary section taken at line 5—5 in Fig. 2.

Fig. 6 is a plan view of a slice of meat after treatment by this machine, showing the two intersecting sets of parallel slits cut into said slice.

Fig. 7 is a perspective view of a stripper employed in this contrivance.

Fig. 8 is an end view of the knife hood.

Fig. 9 is a side view of the knife hood shown in Fig. 8.

In the drawing, the numeral 15 indicates generally a cast frame, the walls 16 and 17 of which support the ends of a pair of rods 18 spaced in parallel relation to serve as a track for the block 19 carrying a turn table 20. An elongated substantially U shaped rod member 21, whose parallel arms 22 are slidably mounted through the front wall 16, and secured at their ends to the block 19, serves as a handle means whereby the turn table 20, provided with upwardly extending prongs 23 to maintain a meat slice 24 thereon, can be slid to and fro along the track rods 18, past and slightly beneath a series of parallel spaced circular knives 25 on a rotatable shaft 26 provided with handle 27, which shaft is removably mounted across the upwardly extending side walls of the frame 15, each of which presents a shaft seat 28 intermediate the front and rear ends of the frame 15.

A hood 29 for covering the knives 25 has complementary shaft seats 30 in its side walls to form pillow block constructions for journalling the shaft 26 across the side walls of the frame 15. This hood is demountably secured to the frame 15 by means of the screws 31 whose shanks sit within the slots 32, and whose heads enter the counterbores 33 respectively, to maintain the assembly. A stripper member 34 having a series of parallel slots 35 and formed as at 36 whereby it may sit over the shaft 26, is maintained secure in the set-up, for its upturned ends 37 rest against the seats 38 recessed on the interior of the hood 29.

The turn table 20 is substantially square, of a dimension presenting a slight clearance when between the side walls 39 of the frame 15, which walls serve as a track therefor. The length of the frame is sufficient to allow said turn table to be slid to lie wholly before and then wholly beyond the knives 25; the front and rear walls 16 and 17 of the frame, acting as stops to limit the movement of the block 19.

Commencing a little to one side of the line of the shaft 26, the side wall portions 39' of the frame 15 are and extend lower than the underside of the turn table 20, that is, for the distance A. However, at the limit of travel of the turn table 20 in this direction, it is important to note that its inner edge 20' still extends between the frame's side walls 39, which are and extend higher than the underside of the turn table 20, that is, for the distance B. With the turn table in such position, it is now noted that one pair of diagonally opposite corners of said table are either chamfered or rounded as at 40 and 40', to clear the side edges 41 and 41' of the track walls 39, while corner 42 is incapable so to clear, upon manual rotation of the turn table 20 about its axis 43.

The coplanar, spaced, horizontal, strengthening ribs 44, extending inwardly from the side walls 39 respectively, also serve to conceal the rods 18 and 22, and most of the slidable block 19, thus enhancing the appearance of the device.

In operation, with the initial set-up of the device as shown in Figs. 1 and 2, the slice of meat 24 placed on the turn table 20 is maintained thereon by means of the prongs 23, and the turn table 20 is in line to enter its track comprising the walls 39, because corner 42 is against one of these walls. The operator now simultaneously turns the crank handle 27 in a clockwise direction and pulls the handle 21 forward, until the block 19 is stopped by the wall 16. At this time, the meat slice 24 has been slit a portion of its thickness by action of the knives 25, along a series of lines 45 parallel with the line of motion of the turn table 20. The handle 21 is now pushed back to its initial position as in Fig. 1; that is, until the block 19 is stopped by the wall 17. Now the turn table 20 is manually shifted in a clockwise direction about its axis 43. All it can move is a quarter turn to the position shown in Fig. 3 because corner 42 cannot clear the side edge 41 of the opposite track wall 39. Simultaneous rotation of the knives 25 and forward movement of the table 20, is now repeated, whereupon the meat slice 24 is slit along a series of parallel lines 46 which are at right angles to the first series of slits 45. The meat slice 24 is now removed from the turn table ready for broiling or other cookery process. It is evident that another slice of meat may now be mounted on the turntable 20, to be treated in like manner as was described for the previous slice 24, except that the turntable 20 is now free to be moved a quarter turn in a counter-clockwise direction after the first slitting operation and before said latter meat slice is subjected to the second slitting operation.

This invention is capable of numerous forms and various applications without departing from the essential features herein disclosed. It is therefore intended and desired that the embodiment shown herein be deemed illustrative and not restrictive, and that the patent shall cover whatever features of patentable novelty exist in the invention disclosed; reference being had to the appended claim rather than to the specific description herein to indicate the scope of the invention.

I claim:

In a meat tendering machine, a frame, a substantially square, meat-holding turn table having a pair of diagonally opposite chamfered corners, reciprocatably mounted on the frame, a pair of parallel guide members carried by the frame, positioned at opposite sides of the turn table, adapted to maintain the turn table against rotation, the turn table being slidable on the frame to a position almost out from between said guide members; the chamfered corners of the turn table at such position of the turn table, being free to clear the guide members, whereby the turn table may be rotated a quarter turn and back a quarter turn, and a shaft carrying a series of knives, journalled on the frame transverse the direction of motion of the turn table, said knives extending towards the plane of movement of the turn table, in the region of the guide members.

T. M. COFFELT.